United States Patent
Miyoshi et al.

(10) Patent No.: US 7,608,561 B2
(45) Date of Patent: Oct. 27, 2009

(54) EXHAUST GAS PURIFYING CATALYST

(75) Inventors: Seiji Miyoshi, Fuchu-cho (JP); Hiroshi Yamada, Fuchu-cho (JP); Koji Minoshima, Fuchu-cho (JP); Akihide Takami, Fuchu-cho (JP); Hideharu Iwakuni, Fuchu-cho (JP)

(73) Assignee: Mazda Motor Corporation (JP)

( * ) Notice: Subject to any disclaimer, the term of this patent is extended or adjusted under 35 U.S.C. 154(b) by 406 days.

(21) Appl. No.: 11/546,340

(22) Filed: Oct. 12, 2006

(65) Prior Publication Data

US 2007/0093381 A1  Apr. 26, 2007

(30) Foreign Application Priority Data

Oct. 26, 2005  (JP) .............................. 2005-311634

(51) Int. Cl.
*B01J 23/00* (2006.01)
*B01J 23/02* (2006.01)
*B01J 23/10* (2006.01)
*B01J 23/40* (2006.01)
*B01J 23/42* (2006.01)
*B01J 23/44* (2006.01)

(52) U.S. Cl. ...................... 502/326; 502/304; 502/327; 502/332; 502/333; 502/334; 502/339; 502/349; 502/439; 502/527.19

(58) Field of Classification Search ................. 502/304, 502/326, 327, 332, 333, 334, 339, 349, 439, 502/527.19
See application file for complete search history.

(56) References Cited

U.S. PATENT DOCUMENTS

| | | | | |
|---|---|---|---|---|
| 5,480,854 A | | 1/1996 | Rajaram et al. | |
| 5,945,369 A | * | 8/1999 | Kimura et al. | 502/304 |
| 5,958,827 A | * | 9/1999 | Suda et al. | 502/304 |
| 5,993,762 A | | 11/1999 | Rajaram et al. | |
| 6,150,288 A | * | 11/2000 | Suzuki et al. | 501/105 |
| 6,294,140 B1 | * | 9/2001 | Mussmann et al. | 423/213.5 |
| 6,306,794 B1 | * | 10/2001 | Suzuki et al. | 502/304 |
| 6,620,392 B2 | * | 9/2003 | Okamoto et al. | 423/213.5 |
| 6,620,762 B2 | * | 9/2003 | Tan et al. | 502/304 |
| 6,834,497 B2 | * | 12/2004 | Miyoshi et al. | 60/277 |
| 6,953,769 B2 | * | 10/2005 | Yamada et al. | 502/302 |

(Continued)

FOREIGN PATENT DOCUMENTS

EP   1 166 858   1/2002

(Continued)

OTHER PUBLICATIONS

European Search Report Application No. EP 06 12 2787 dated on Feb. 5, 2008.

*Primary Examiner*—Cam N Nguyen
(74) *Attorney, Agent, or Firm*—Studebaker & Brackett PC; Donald R. Studebaker

(57) ABSTRACT

An exhaust gas purifying catalyst comprising: a honeycomb-like substrate disposed in an exhaust passage for an engine; and a catalytic layer formed on a cell wall of said substrate, said catalytic layer including a mixed oxide which contains Ce (cerium) and Zr (zirconium), and retains a catalytic noble metal in such a manner that said noble metal atoms are located at crystal lattice points or between the lattice points of the mixed oxide, wherein said mixed oxide includes a first mixed oxide containing $CeO_2$ in a mass greater than that of $ZrO_2$, and a second mixed oxide containing $ZrO_2$ in a mass greater than that of $CeO_2$.

5 Claims, 10 Drawing Sheets

U.S. PATENT DOCUMENTS

| | | | |
|---|---|---|---|
| 7,307,039 B2 * | 12/2007 | Iwakuni et al. | 502/304 |
| 7,341,975 B2 * | 3/2008 | Iwakuni et al. | 502/326 |
| 7,344,683 B2 * | 3/2008 | Miyoshi et al. | 422/172 |
| 2004/0077494 A1 | 4/2004 | LaBarge et al. | |
| 2004/0151645 A1 * | 8/2004 | Li | 423/213.5 |
| 2005/0119120 A1 | 6/2005 | Iwakuni et al. | |
| 2006/0019824 A1 * | 1/2006 | Miyoshi et al. | 502/304 |
| 2006/0052242 A1 | 3/2006 | Iwakuni et al. | |

FOREIGN PATENT DOCUMENTS

| | | |
|---|---|---|
| EP | 1 199 096 | 4/2002 |
| EP | 1 563 893 | 8/2005 |
| EP | 1 728 552 | 12/2006 |
| JP | 06-246155 | 9/1994 |
| JP | 10-296087 | 11/1998 |
| JP | 2000-300989 | 10/2000 |
| JP | 2003 299967 | 10/2003 |
| JP | 2004-174490 | 6/2004 |
| JP | 2004-344796 | 12/2004 |
| JP | 2005-028334 | 2/2005 |

\* cited by examiner

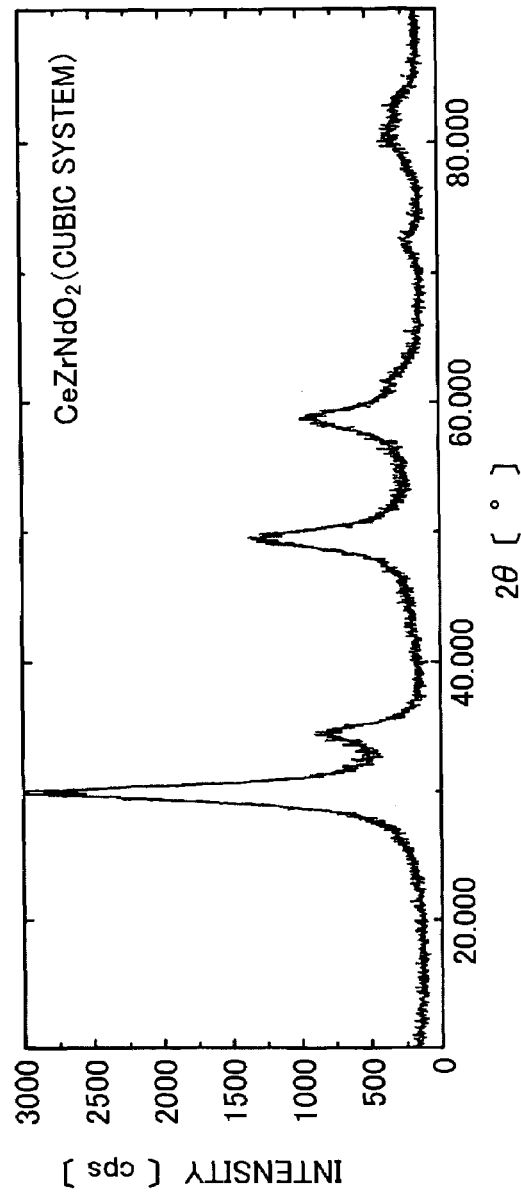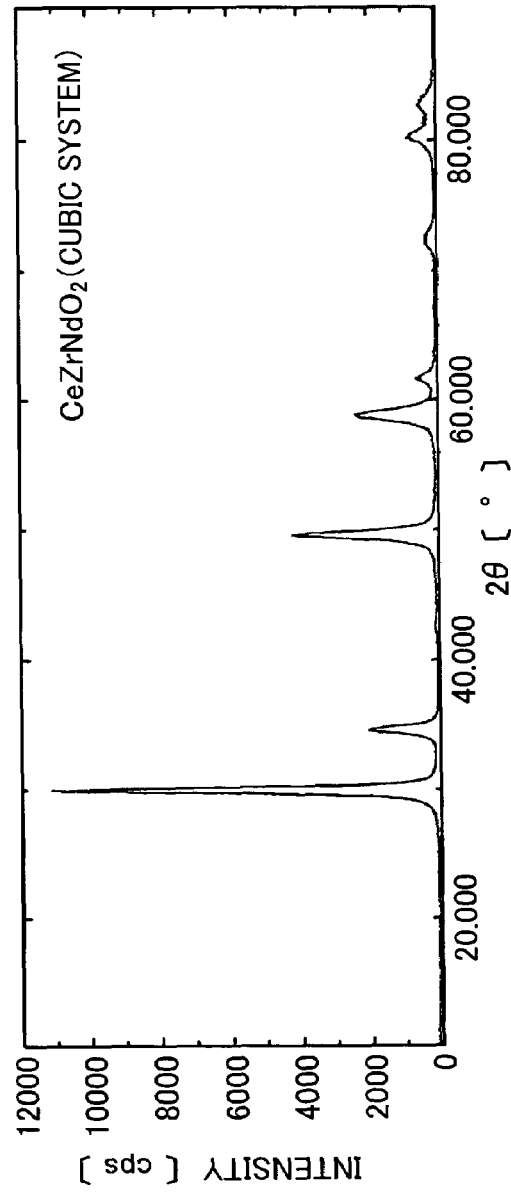
FIG.11A
FIG.11B

EXHAUST GAS PURIFYING CATALYST

BACKGROUND OF THE INVENTION

1. Field of the Invention

The present invention relates to a catalyst for decreasing emissions contained in exhaust gas, such as hydrocarbon (HC), carbon monoxide (CO) and nitrogen oxides (NOx).

2. Description of the Related Art

Generally, an exhaust system for an engine is provided with a purifying catalyst for decreasing harmful emissions in exhaust gas from the engine. This purifying catalyst typically comprises an oxide support, and a catalytic noble metal, such as Pt, Pd and/or Rh, supported on the oxide support. This catalytic noble metal involves a problem about sintering which is more likely to occur along with a rise in exhaust gas temperature. Thus, there is a strong need for retaining the catalytic noble metal in a highly dispersed state to suppress the sintering even under a high-temperature atmosphere.

With a view to meeting the above need, there has been proposed an exhaust gas purifying catalyst which comprises a honeycomb-like substrate, and a catalytic layer formed on a cell wall of the substrate, as disclosed, for example, in Japanese Patent Laid-Open Publication No. 2004-174490. The catalytic layer includes an activated alumina, and an oxygen-absorbing material consisting of a mixed oxide (composite oxide) which contains Ce, Zr and Nd, and retains Rh as a catalytic noble metal in such a manner that Rh atoms are located at crystal lattice points or between the lattice points of the mixed oxide. In this purifying catalyst, the catalytic noble metal is strongly bonded to the mixed oxide and restricted in its migration even under a high-temperature atmosphere because of retaining Rh atoms as the catalytic noble metal at crystal lattice points or between the lattice points of the mixed oxide, and thus, the occurrence of sintering is effectively suppress and thereby provide enhanced heat resistance. In addition, the catalytic noble metal can be retained in a dispersed manner so as to enhance conversion efficiency of exhaust emissions.

Japanese Patent Laid-Open Publication No. 2005-161143 also discloses the same type of exhaust gas purifying catalyst as that in the Japanese Patent Laid-Open Publication No. 2004-174490, which has a catalytic noble metal retained such that atoms of the noble metal are located at crystal lattice points or between the lattice points of a mixed oxide.

From the perspective of improving air environment, there has been a need for further enhanced conversion efficiency of exhaust emissions in recent years. In thus situation, while the purifying catalyst having one kind of mixed oxide retaining a catalytic noble metal, as disclosed in the above publications, can enhance conversion efficiency in some extent by suppress the occurrence of sintering and enhance heat resistance, it has a certain limit of improvement in its conversion efficiency.

In view of the above problem, it is an object of the present invention to provide a purifying catalyst capable of achieving further enhanced conversion efficiency of exhaust emissions.

SUMMARY OF THE INVENTION

Through various researches, the inventors found that, in a mixed oxide containing Ce (cerium) and Zr (zirconium) and retaining a catalytic noble metal in such a manner that atoms of the noble metal are located at crystal lattice points or between the lattice points thereof, depending of whether a content of $CeO_2$ or $ZrO_2$ is greater than that of the other by a given value in a mixing ratio by mass, i.e., mass ratio, between $CeO_2$ and $ZrO_2$ in the mixed oxide, an oxygen absorption amount and an amount of the doped catalytic noble metal to be partially exposed outside from a surface of the mixed oxide are changed, and consequently a type of reaction to be actively performed is changed. Based on this knowledge, the inventors have achieved the present invention capable of efficiently inducing a reaction with emissions in exhaust gas to purify the exhaust gas.

Specifically, in order to achieve the above object, the present invention provides an exhaust gas purifying catalyst which comprises a honeycomb-like substrate disposed in an exhaust passage for an engine, and a catalytic layer formed on a cell wall of the substrate. The catalytic layer includes a mixed oxide which contains Ce and Zr, and retains a catalytic noble metal in such a manner that a large part of atoms of the novel metal are located at crystal lattice points or between the lattice points of the mixed oxide. Further, the mixed oxide includes a first mixed oxide containing $CeO_2$ in a mass greater than that of $ZrO_2$, and a second mixed oxide containing $ZrO_2$ in a mass greater than that of $CeO_2$.

The above exhaust gas purifying catalyst of the present invention can achieve improved conversion efficiency as compared with the conventional purifying catalysts, as described later in detail in connection with test data. This mechanism would be for the following reason.

It is believed that a reaction for partially oxidizing hydrocarbon (hydrocarbon partial oxidation reaction) and a reaction for forming $H_2$ ($H_2$ formation reaction) are accelerated primarily by the second mixed oxide containing $ZrO_2$ in a mass greater than that of $CeO_2$, and an a reaction for oxidizing $H_2$ ($H_2$ oxidation reaction) and a reaction for oxidizing CO (CO oxidation reaction) are accelerated primarily by the first mixed oxide containing $CeO_2$ in a mass greater than that of $ZrO_2$. Thus, $H_2$ formed by the $H_2$ formation reaction based on the second mixed oxide will be immediately oxidized by the $H_2$ oxidation reaction based on the first mixed oxide. In other words, it is believed that, while $H_2$ to be used in the $H_2$ oxidation reaction based on the first mixed oxide will be run out within a short period of time if only $H_2$ in exhaust gas is used therefor, the $H_2$ oxidation reaction based on the first mixed oxide can be efficiently performed using $H_2$ supplied from the $H_2$ formation reaction based on the second mixed oxide, which allows further improved conversion efficiency to be achieved as described above.

In addition, the exhaust gas purifying catalyst of the present invention makes it possible to quickly raise a temperature of a catalyst bed so as to achieve improved light-off (warm-up) characteristic. That is, it is believed that, among the reactions based on the first and second mixed oxides, the reactions for $H_2$ and CO are firstly induced, and heat resulting from these reactions can contribute to a temperature rise in the catalyst bed so as to quickly activate the purifying catalyst to achieve improved light-off characteristic.

BRIEF DESCRIPTION OF THE DRAWINGS

FIG. 11A is a graph showing an XRD chart of a second mixed oxide in its fresh state.

FIG. 11B is a graph showing an XRD chart of the second mixed oxide after aging.

DETAILED DESCRIPTION OF THE PREFERRED EMBODIMENTS OF THE INVENTION

Figure 1:
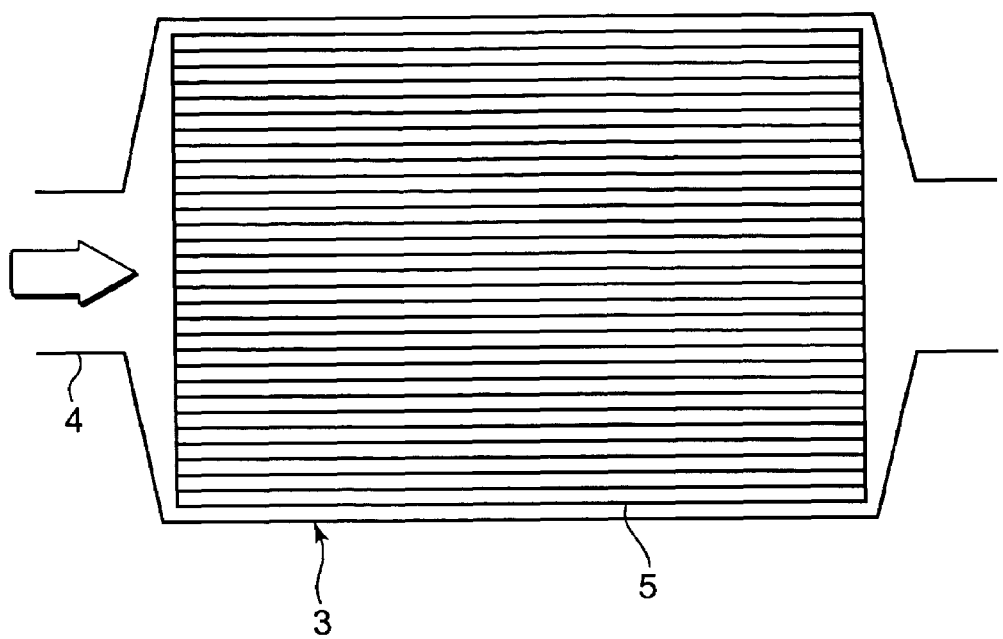
FIG. 1 is an explanatory diagram schematically showing a purifying catalyst according to one embodiment of the present invention.

With reference to the drawings, a preferred embodiment of the present invention will now be described. FIG. 1 is a schematic sectional view showing a catalytic converter.

The catalytic converter 3 is disposed in an exhaust passage fluidically connected to an engine, and designed to purify hydrocarbon, carbon monoxide and nitrogen oxides containing in exhaust gas flowing therein. This catalytic converter 3 comprises a heat-resistant container 4, and a purifying catalyst 5 housed in the heat-resistant container 4. Even though not shown, the heat-resistant container 4 is provided with a temperature sensor for detecting a gas temperature in an inlet of the purifying catalyst 5.

The purifying catalyst 5 comprises an approximately columnar-shaped honeycomb substrate having a large number of cells divided by a partition wall, and a catalytic layer formed on the cell wall of the substrate. When exhaust gas passes through the cells from an upstream side to a downstream side of the purifying catalyst 5, it diffuses into the catalytic layer formed on a surface of the cells and comes in contact with catalytic noble metals, so that harmful emissions (HC, CO, NOx) in the exhaust gas are purified. For example, a ceramic substrate made of cordierite or a metal substrate made of stainless steel may be used as the honeycomb substrate of the purifying catalyst 5.

The catalytic layer of the purifying catalyst 5 is formed by coating the surface of the cell wall with a catalytic material. This catalytic material includes a mixed oxide retaining a catalytic noble metal. More specifically, the catalytic noble metal is retained in a surface region of the mixed oxide, and further in an inside region of the mixed oxide in such a manner that atoms thereof are located at crystal lattice points or between the lattice points of the mixed oxide.

Figure 2:
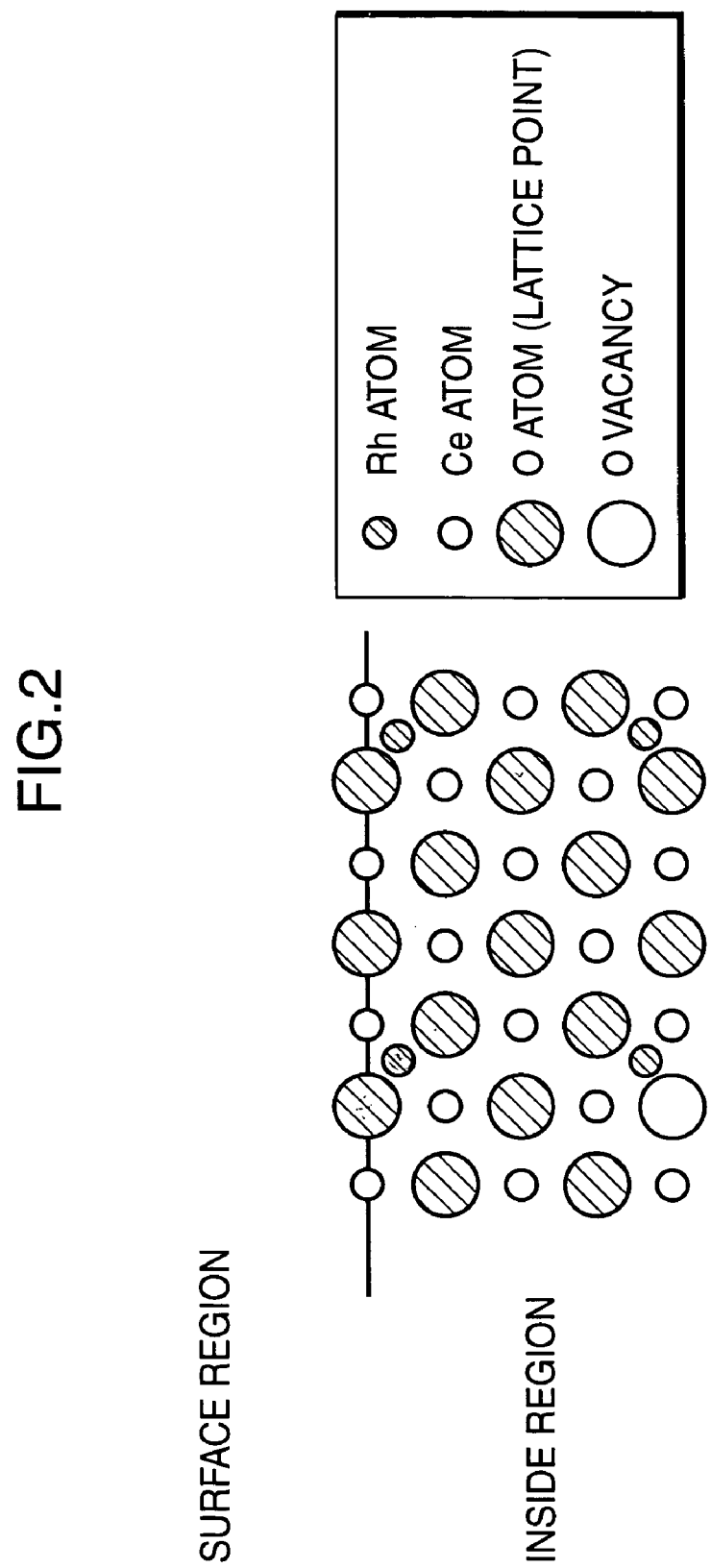
FIG. 2 is an explanatory diagram schematically showing a catalytic material structure of the purifying catalyst according to the embodiment.

A specific structure of the catalytic material will be described below. As schematically shown in FIG. 2, a part of atoms of the catalytic noble metal (e.g., Rh) are located at crystal lattice points or between the lattice points, and thereby strongly bonded to the mixed oxide. In either case, the catalytic noble metal, such as Rh, is strongly bonded to the surface and inside regions of the mixed oxide in a uniformly dispersed manner.

Figure 3:
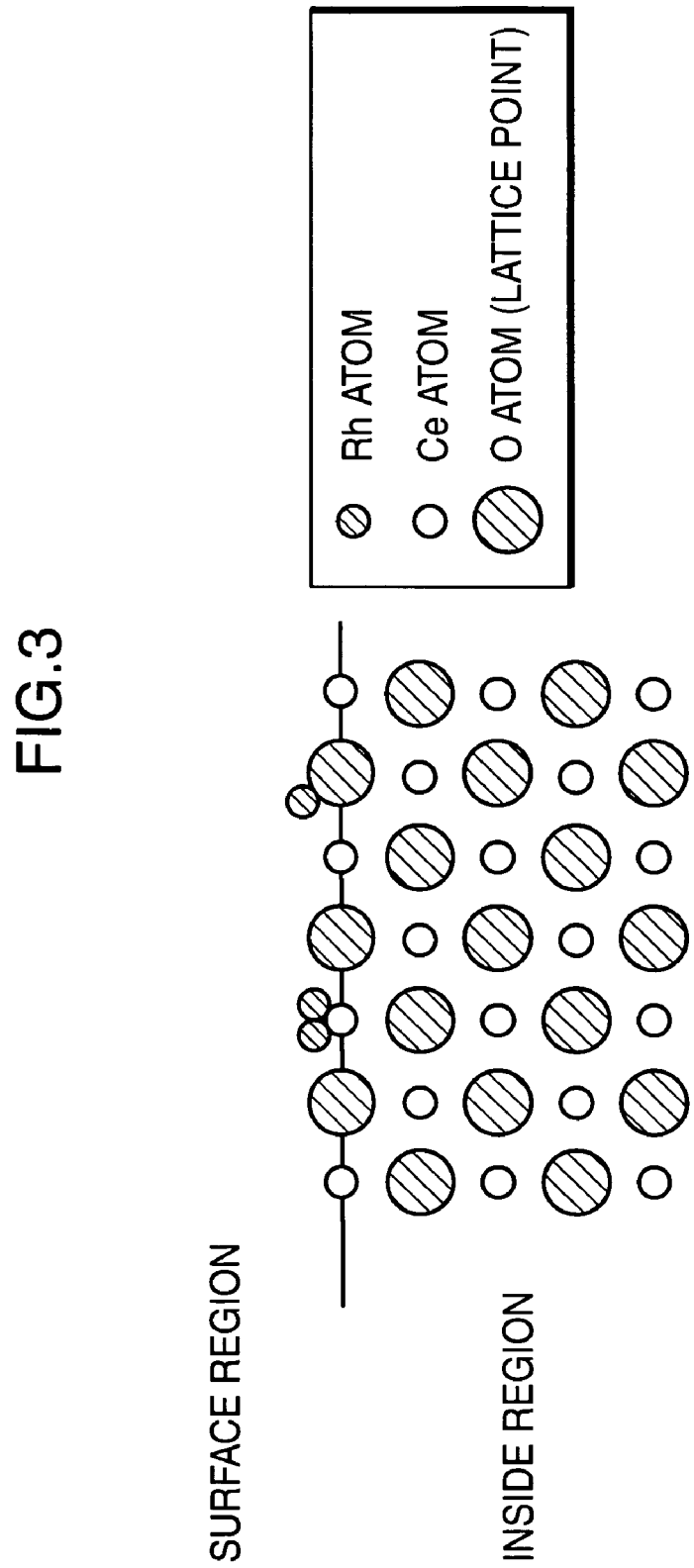
FIG. 3 is an explanatory diagram schematically showing a catalytic material structure of a conventional purifying catalyst.

FIG. 3 schematically shows the structure of a conventional catalytic material which retains Rh on a surface of a mixed oxide. In this conventional catalytic material, Rh is simply retained on a surface of a cerium—zirconium mixed oxide. Thus, Rh atoms are likely to migrate under a high-temperature atmosphere, resulting in the occurrence of sintering.

Differently from the conventional catalytic material, Rh atoms in this embodiment are retained in the inside and surface region of the mixed oxide, and a part of the Rh atoms in the surface region are retained in such a manner as to be partially exposed outside the surface of the mixed oxide. This makes it possible to restrict migration of the Rh atoms even under a high-temperature so as to effectively suppress the sintering.

The catalytic noble metal is provided as a means to oxidize hydrocarbon (HC) and carbon monoxide (CO) and reduce nitrogen oxides. For example, the catalytic noble metal may be at least one selected from the group consisting of platinum (Pt), palladium (Pd) and rhodium (Rh). Among these catalytic noble metals, Rh and Pd can advantageously decrease NOx even at relatively low-temperature state and achieve excellent conversion efficiency even at a high-temperature atmosphere. Pt has an advantage of being able to efficiently decrease saturated hydrocarbon which is likely to be generated during cold start. In particular, Rh is advantageously included to provide excellent oxygen absorption/release performance so as to achieve enhanced conversion efficiency.

An oxygen-absorbing material, such as a cerium-zirconium mixed oxide comprising a cerium oxide ($CeO_2$) and a zirconium oxide ($ZrO_2$) incorporated in the cerium oxide as a solid solution, may be used as the mixed oxide for retaining the catalytic noble metal. In particular, the mixed oxide for use in the present invention contains cerium (Ce) and zirconium (Zr), and comprises a combination of a plurality of different mixed oxides, such as a plurality of cerium—zirconium mixed oxides different in a mass ratio between a cerium oxide (ceria: $CeO_2$) and a zirconium oxide (zirconia: $ZrO_2$). The mixed oxide includes a first mixed oxide which contains $CeO_2$ in greater than 50 mass % with respect to a total mass of $CeO_2$ and $ZrO_2$, and a second mixed oxide contains $ZrO_2$ in greater than 50 mass % with respect to a total mass of $CeO_2$ and $ZrO_2$. Preferably, the first mixed oxide which contains $CeO_2$ in 65 mass % or more with respect to a total mass of $CeO_2$ and $ZrO_2$, and a second mixed oxide which contains $ZrO_2$ in 65 mass % or more with respect to a total mass of $CeO_2$ and $ZrO_2$. In other words, the mixed oxide includes the first mixed oxide which comprises a primary component of ceria (i.e., ceria-rich mixed oxide), and the second mixed oxide which comprises a primary component of zirconia (i.e., zirconia-rich mixed oxide).

Each of the first and second mixed oxides are prepared based on a mixed oxide precursor formed by mixing a nitrate solution containing the catalytic noble metal, with an acidic solution containing Ce and Zr, and subjecting the obtained mixture to a coprecipitation process using ammonia (ammonia coprecipitation process). Specifically, the mixed oxide precursor is rinsed with water, and heatingly dried at a given temperature. Then, the dried product is sintered to obtain the mixed oxide. More specifically, in order to obtain the first mixed oxide, in the acidic solution to be mixed with the nitrate solution containing the catalytic noble metal, a content rate of $CeO_2$ (corresponding value of Ce in oxide) is set at a value greater than that of $ZrO_2$ (corresponding value of Zr in oxide), and preferably, at 65 mass % or more with respect to a total mass of $CeO_2$ and $ZrO_2$. Further, in order to obtain the second mixed oxide, in the acidic solution to be mixed with the nitrate solution containing the catalytic noble metal, a content rate of $ZrO_2$ (corresponding value of Zr in oxide) is set at a value greater than that of $CeO_2$ (corresponding value of Ce in oxide), and preferably, at 65 mass % or more with respect to a total mass of $CeO_2$ and $ZrO_2$.

In addition to $CeO_2$ and $ZrO_2$, the mixed oxide may include any other suitable metal oxide (e.g., neodymium oxide).

In the following description, one type of mixed oxide retaining the catalytic noble metal in such a manner that a part of atoms thereof are partially exposed outside from the surface thereof, and the remaining atoms are located in an inside region thereof will be referred to as "catalytic noble metal-doped mixed oxide".

The catalytic layer is prepared by mixing the first and second mixed oxides together, slurrying the obtained mixture, and forming the obtained slurry into a single layer, or by laminating one or more layers of the first mixed oxide and one or more layers of the second complex oxide to form a multi-layer (e.g., two-layer) structure. When a two-layer structure is formed by laminating the respective layers of the first and second mixed oxides, any one of the layers of the first and second mixed oxides can be formed as an upper layer. Preferably, the layer of the second mixed oxide is formed as a lower layer to quickly raise a catalyst temperature using heat resulting from a reaction, such as the $H_2$ formation reaction.

A mass ratio between the first and second mixed oxides in the catalytic material is set preferably in a range allowing a low-temperature activity at least in a light-off characteristic T50 to become better than that of a catalytic material consisting only of first mixed oxide, as described later in more detail in connection with test data, more preferably, in a range additionally allowing a high-temperature conversion ratio C400 to become greater than a given value (e.g., 95% in an after-mentioned test). In view of the light-off characteristic, the first mixed oxide may be set in the range of 5 to 99 mass % with respect to a total mass of the first and second mixed oxides. When additionally taking account of the high-temperature conversion ratio, the first mixed oxide is preferably set in the range of 20 to 99 mass %. Further, with respect to the total mass of the first and second mixed oxides, the first mixed oxide is set more preferably in the range of 30 to 80 mass %, particularly preferably, in the range of 45 to 75 mass %. In this manner, the mass ratio of the first mixed oxide can be set in more limited range to achieve enhanced conversion efficiency, particularly, the high-temperature conversion ratio C400.

As compared with a purifying catalyst singly using $CeO_2$ (ceria) or $ZrO_2$ (zirconia), the purifying catalyst 5 makes it possible to provide sufficiently improved conversion efficiency (light-off temperature T50, high-temperature conversion ratio C400, high-temperature conversion ratio C500), as described later in more detail in connection with test data.

The above improvement in conversion efficiency would be the following reason.

It is believed that an hydrocarbon partial oxidation reaction and an $H_2$ formation reaction are accelerated primarily by the second mixed oxide containing $ZrO_2$ in 50 mass % or more, preferably 65 mass % or more with respect to a total mass of $CeO_2$ and $ZrO_2$, and an $H_2$ oxidation reaction and CO oxidation reaction are accelerated primarily by the first mixed oxide containing $CeO_2$ in 50 mass % or more, preferably 65 mass % or more with respect to a total mass of $CeO_2$ and $ZrO_2$. Based on this assumption, $H_2$ formed by the $H_2$ formation reaction based on the second mixed oxide will be immediately oxidized by the $H_2$ oxidation reaction based on the first mixed oxide. In other words, it is believed that, while $H_2$ to be used in the $H_2$ oxidation reaction based on the first mixed oxide will be run out within a short period of time if only $H_2$ in exhaust gas is used therefor, the $H_2$ oxidation reaction based on the first mixed oxide can be efficiently performed using $H_2$ supplied from the $H_2$ formation reaction based on the second mixed oxide. This would allow the catalytic converter 5 to efficiently perform a conversion reaction and thereby provide further improved conversion efficiency.

In addition, among the reactions based on the first and second complex catalysts, the reactions for $H_2$ and CO are firstly induced, and heat resulting from these reactions can contribute to a temperature rise in the catalytic layer so as to quickly activate the catalytic material forming the catalytic layer. Thus, this purifying catalyst can achieve improved light-off characteristic, as described later in more detail in connection with test data.

A test for evaluating a conversion efficiency of the purifying catalyst 5 to verify the above effects was carried out. The detail and result of the test will be described below.

EXAMPLES

[Determination of Content Rates of $CeO_2$ and $ZrO_2$ in each of First and Second Mixed oxides]

A mass ratio between $CeO_2$ and $ZrO_2$ to be contained in each of the first and second mixed oxides is determined based on the following test data.

A plurality of mixed oxides were formed by variously changing a mass ratio between $CeO_2$ and $ZrO_2$, and then Rh was doped into each of the mixed oxides in such a manner that atoms thereof are located at crystal lattice points or between the lattice points to prepare a plurality of samples. Each of the samples was set in a model-gas flow reactor, and model exhaust gas (temperature: 600° C.) with a rich air-fuel ratio was supplied to pass through the sample for 10 minutes. Then, a light-off temperature T50 and a high-temperature conversion ratio for each of HC, CO and NOx conversions were measured, and the result was graphed out. Based on the graph, it was proven that ones of the samples having high and low values of $ZrO_2/(CeO_2+ZrO_2)$ had excellent conversion efficiency. Thus, the mass ratio between $CeO_2$ and $ZrO_2$ was determined based on this data.

Figure 4:
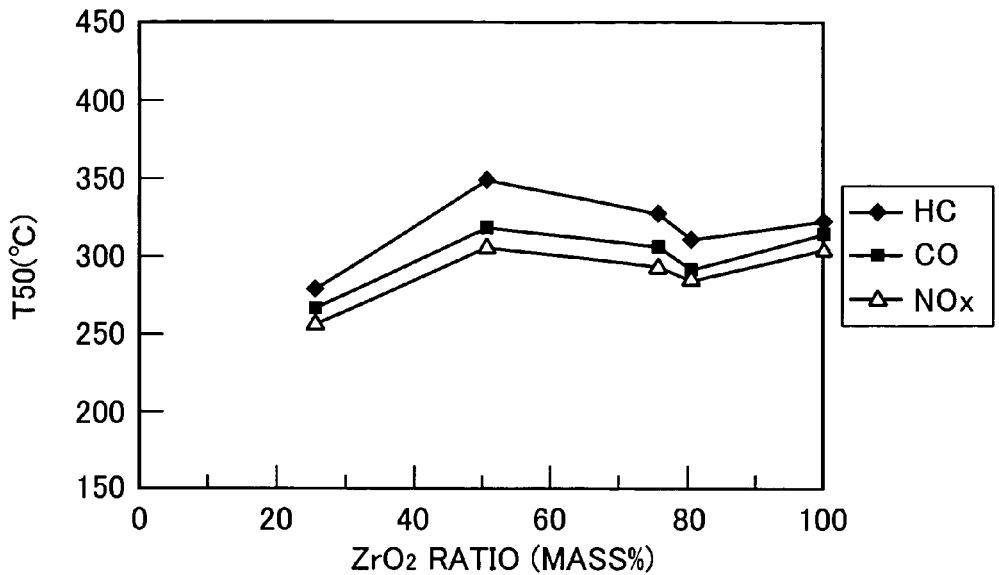
FIG. 4 is a graph showing an influence of a ratio of $ZrO_2$ in a Zr—Ce based mixed oxide, on a light-off temperature T50.
Figure 5:
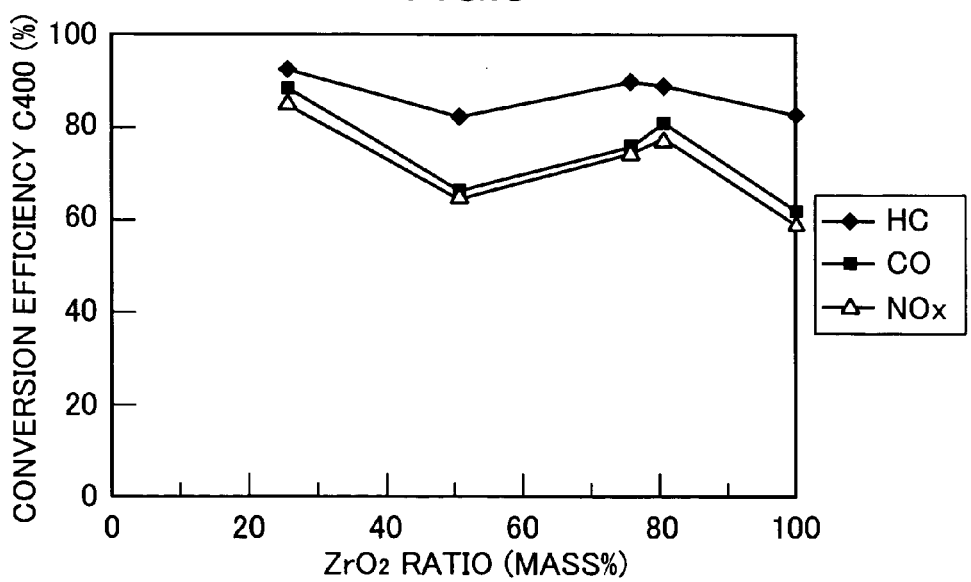
FIG. 5 is a graph showing an influence of a ratio of $ZrO_2$ in a Zr—Ce based mixed oxide, on a high-temperature conversion ratio C400.
Figure 6:
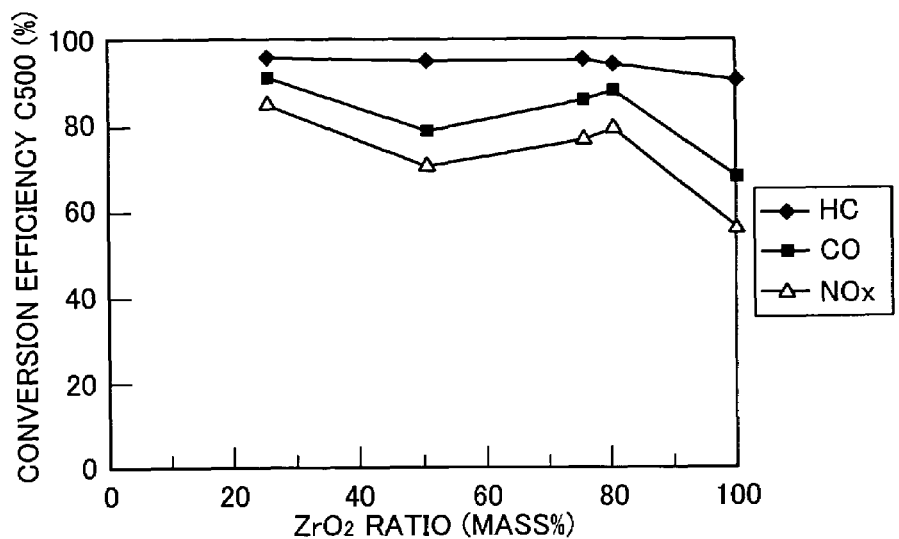
FIG. 6 is a graph showing an influence of a ratio of $ZrO_2$ in a Zr—Ce based mixed oxide, on a high-temperature conversion ratio C500.

FIGS. 4 to 6 show the measurement result of a light-off temperature T50 and high-temperature conversion ratios C400 and C500. FIG. 4 is a graph showing a relationship between a ratio of $ZrO_2$ and a light-off temperature T50, and FIG. 5 is a graph showing a relationship between a ratio of $ZrO_2$ [$ZrO_2/(CeO_2+ZrO_2)$] and a high-temperature conversion ratio C400. FIG. 6 is a graph showing a relationship between a ratio of $ZrO_2$ and a high-temperature conversion ratio C500. A mixed oxide in FIGS. 4 to 6 is a catalytic novel metal-doped mixed oxide containing 0.486 mass % of Rh as a catalytic noble metal, which is prepared by use of zirconium oxynitrate, cerium (I) nitrate and rhodium nitrate, as raw materials, and through a coprecipitation process based on the addition of aqueous ammonia, in the same manner as that in the following first mixed oxide.

As seen in FIGS. 4 to 6, when the ratio of $ZrO_2$ is set at 65 mass % or more, or at less than 35 mass % (the ratio of $CeO_2$ is set at less than 35 mass %, or at 65 mass % or more), an excellent result could be obtained in each of the light-off temperature T50 and the high-temperature conversion ratios C400 and C500. In particular, when the ratio of $ZrO_2$ is set in the range of 20 to 30 mass % or in the range of 65 to 90 mass %, a more excellent result could be obtained in each of the light-off temperature T50 and the high-temperature conversion ratios C400 and C500. Further, it is proven that the ratio of $ZrO_2$ is preferably set at 30 mass % or less, or at about 80% to achieve about 80% or more of conversion efficiency in the high-temperature conversion ratios C400 and C500.

Therefore, the ratio between $CeO_2$ and $ZrO_2$ in each of the first and second mixed oxides may be desirably set in the above ranges.

Based on this knowledge, a mixed oxide for use in a test was prepared.

[Preparation of Mixed Oxides]

(First Mixed oxide)

As the first step for preparing a first mixed oxide, zirconium oxynitrate, cerium (I) nitrate and Neodymium (III) nitrate hydrate, a rhodium nitrate solution and water were mixed together to prepare total 300 ml of mixed solution. This mixed solution was stirred at room temperature for about one hour, and then heated up to 80° C. Then, the mixed solution was mixed with 50 ml of 28% aqueous ammonia. This mixing was performed by dropping each of the mixed solution and the aqueous ammonia from a tube into a cup of a high-speed disperser to apply a rotational force and a shearing force to the mixed solution and the aqueous ammonia in the cup so as to mix them within about one second.

The obtained mixture was left unattended all day and night. Then, a formed cake (caked solid of high specific-gravity substances) was centrifugalized, and then sufficiently rinsed with water. The rinsed cake was dried at about 150° C. The dried cake was sintered at 400° C. for 5 hours and subsequently at 500° C. for 2 hours to obtain a Rh-doped first mixed oxide. With the exclusion of Rh, this Rh-doped first mixed oxide is arranged to comprise 68 weight % of $CeO_2$, 22 weight % of $ZrO_2$ and 10 weight % of $Nd_2O_3$. The Rh-doped first mixed oxide includes 0.058 mass % of Rh as a catalytic noble metal. Then, a given amount of Rh was further retained (retained in a late stage) on a surface of the Rh-doped first mixed oxide to obtain the first mixed oxide.

(Second Mixed Oxide)

Except for the mixing ratio between Ce and Zr to be contained in the mixed solution, a Rh-doped second mixed oxide is prepared in the same manner as that in the above Rh-doped first mixed oxide, and description of the preparation process will be omitted. With the exclusion of Rh, the obtained Rh-doped second mixed oxide is arranged to comprise 22 weight % of $CeO_2$, 68 weight % of $ZrO_2$ and 10 weight % of $Nd_2O_3$. The Rh-doped second mixed oxide includes 0.058 mass % of Rh as a catalytic noble metal, as with the Rh-doped first mixed oxide. Then, a given amount of Rh was further retained (retained in a late stage) on a surface of the Rh-doped second mixed oxide to obtain the second mixed oxide (an amount of Rh retained in a late stage will be described later).

Examples 1 to 3 & Comparative Examples 1 and 2

(Preparation of Samples)

The obtained first and second mixed oxides were mixed together while changing a mixing ratio to produce a plurality of different purifying catalysts, and each of the purifying catalyst was attached to a honeycomb substrate through a coating process to form a catalytic layer with a single-layer structure. In this way, a plurality of different samples were obtained. The honeycomb substrate used in the examples had a diameter of 25.4 mm, a length of 50 mm, 400 cells per square inch (about 6.54 $cm^2$) and a partition wall (between the adjacent cells) thickness of 4 mil (about 0.1 mm).

More specifically, the first mixed oxide, the second mixed oxide, alumina, zirconyl nitrate serving as binder and water each set at a given amount are mixed together to prepare a slurry. Then, the honeycomb substrate before supporting the catalytic layer was immersed in the slurry, and then pulled out of the slurry. After blowing out excess slurry, the honeycomb substrate with the remaining slurry was sintered at 500° C. for 2 hours to prepare Examples 1 to 3 and Comparative Examples 1 and 2. Respective contents of the Rh-doped first and second mixed oxides in each of Examples 1 to 3 and Comparative Examples 1 and 2, and respective Rh amounts retained on the surfaces of the Rh-doped first and second mixed oxides (amounts of Rh retained in a late stage), are shown in Table 1. In Table 1, "g/L" as a unit of each amount represents a mess per liter of the catalyst substrate.

TABLE 1

|  | Example 1 | Example 2 | Example 3 | Comparative Example 1 | Comparative Example 2 |
|---|---|---|---|---|---|
| First mixed oxide |  |  |  |  |  |
| Late-stage retained Rh amount (g/L) | 0.0487 | 0.0325 | 0.0163 | 0.065 | — |
| Rh-doped first mixed oxide (g/L) | 84 | 56 | 28 | 112 | — |
| Second mixed oxide |  |  |  |  |  |
| Late-stage retained Rh amount (g/L) | 0.0163 | 0.0325 | 0.0487 | — | 0.065 |
| Rh-doped second mixed oxide (g/L) | 28 | 56 | 84 | — | 112 |
| 5% La-containing alumina |  |  | 50 |  |  |

These catalysts (Examples 1 to 3 and Comparative Examples 1 and 2) were subjected to aging in an atmospheric atmosphere at a temperature of 1000° C. for a hold time of 24 hours.

(Evaluation for Conversion Efficiency)

A model-gas flow reactor and an exhaust emission analyzer were used. A light-off temperature T50 and a high-temperature conversion ratio C400 for each of HC, CO and NOx were measured in each of the catalysts of Examples 1 to 3 and Comparative Examples 1 and 2 (each of which was set in the model-gas flow reactor after the above aging, and then exposed to a rich air-fuel ratio model gas (temperature: 600° C.) supplied thereto for 10 minutes. T50 means a gas temperature in an inlet of the catalyst (catalyst-inlet gas temperature) at a time when each of the conversion efficiencies reaches 50% as a temperature of the model gas flowing into the catalyst is gradually increased from room temperature. C400 means each of the conversion efficiencies at a catalyst-inlet gas temperature of 400° C. The model gas had an A/F of 14.7±0.9. Specifically, mainstream gas with an A/F of 14.7 was constantly supplied, and a given volume of variation gas was added thereto in a pulsed pattern at a frequency of 1 Hz to forcibly fluctuate the A/F at a magnitude of ±0.9. A space velocity SV of the model gas was 60000 $h^{-1}$ and a temperature rising speed was 30° C./min.

Figure 7:
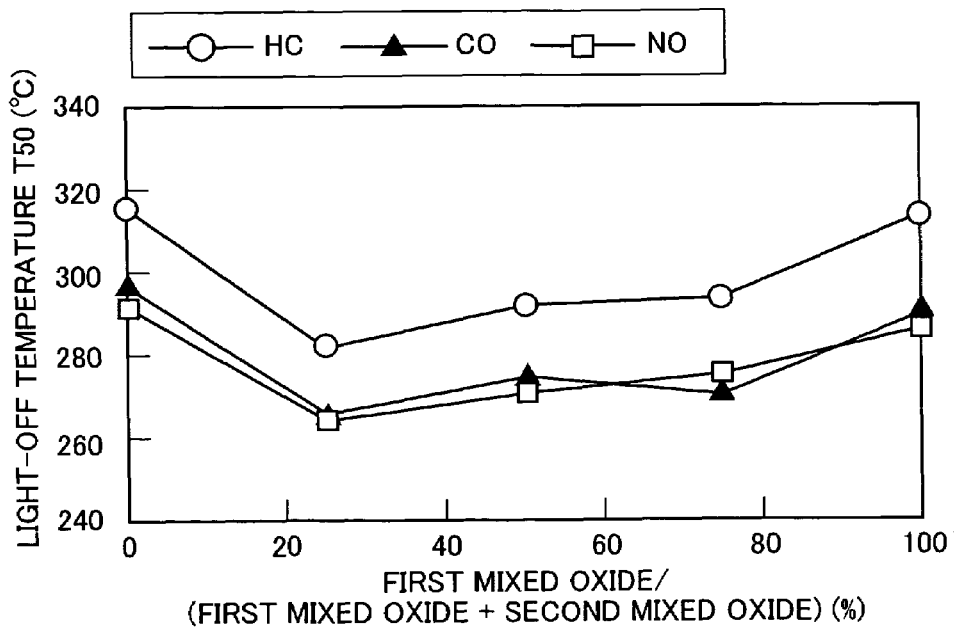
FIG. 7 is a graph showing a relationship between a mass ratio of a first mixed oxide contained in a purifying catalyst and a light-off temperature T50.
Figure 8:
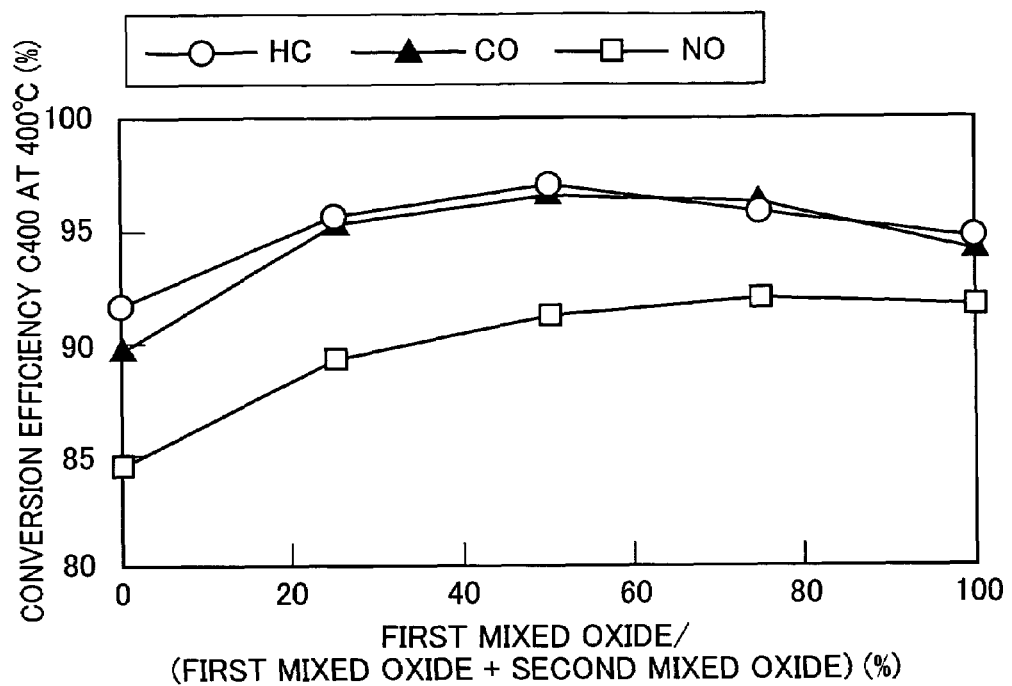
FIG. 8 is a graph showing a relationship between a mass ratio of a first mixed oxide contained in a purifying catalyst and a high-temperature conversion ratio C400.

FIGS. 7 and 8 show the measurement result. FIG. 7 is a graph showing T50 in Examples 1 to 3 and Comparative Examples 1 and 2, and FIG. 8 is a graph showing C400 in Examples 1 to 3 and Comparative Examples 1 and 2.

As seen in FIGS. 7 and 8, in both the light-off temperature T50 and the high-temperature conversion ratio C400, the catalytic layer formed of a mixture of the first and second mixed oxides is superior to the catalytic layer formed using only either one of the first and second mixed oxides. Based on this test result, for example, the following points could be found out: with a view to setting the light-off characteristic T50 at about 315° C. or less, the mass of the first mixed oxide is preferably set in the range of 5 to 99 mass % with respect to the total mass of the first and second mixed oxides; and, with a view to setting the high-temperature conversion ratio C400 for HC at 95% or more, the mass of the first mixed oxide is preferably set in the range of 20 to 99 mass % with respect to the total mass of the first and second mixed oxides. Further, the mass of the first mixed oxide is set more preferably in the range of 30 to 80 mass %, particularly preferably in the range of 45 to 75 mass %.

In the above manner, a mixture of the first and second mixed oxides can be contained in the catalytic material of the catalytic layer to achieve improved conversion efficiency as compared with the catalytic material including only either one of the first and second mixed oxides.

Examples 4 to 9

(Preparation of Samples)

Examples 4 to 9 are different from Example 1 to 3 in that one catalytic layer containing only the first mixed oxide among the first and second mixed oxides, and another catalytic layer containing only the second mixed oxide among the first and second mixed oxides, are laminated to form a laminated catalytic layer on the cell wall of the honeycomb substrate.

As the first step for preparing Examples 4 to 9, either one of the first and second mixed oxides, alumina, zirconyl nitrate serving as binder and water each set at a given amount are mixed together to prepare a slurry. Then, the honeycomb substrate before supporting the catalytic layer was immersed in the slurry, and then pulled out of the slurry. After blowing out excess slurry, the honeycomb substrate with the remaining slurry was sintered at 500° C. for 2 hours to form a first layer (lower layer) on the honeycomb substrate. Then, the other mixed oxide, alumina, zirconyl nitrate serving as binder and water each set at a given amount are mixed together to prepare a slurry. Then, the honeycomb substrate formed with the first layer was immersed in the slurry, and then pulled out of the slurry. After blowing out excess slurry, the honeycomb substrate with the remaining slurry was sintered at 500° C. for 2 hours to prepare Examples 4 to 9. Respective contents of the Rh-doped first and second mixed oxides in each of Examples 4 to 9, and respective Rh amounts retained on the surfaces of the Rh-doped first and second mixed oxides (amounts of Rh retained in a late stage), are shown in Tables 2 and 3. In Tables 2 and 3, "g/L" as a unit of each amount represents a mess per liter of the catalyst substrate.

TABLE 2

| | | Example 4 | Example 5 | Example 6 |
|---|---|---|---|---|
| Upper layer | Late-stage retained Rh amount (g/L) | 0.0163 | 0.0325 | 0.0487 |
| | Zr-riched Rh-doped OSC material (g/L) | 28 | 56 | 84 |
| | 5% La-containing alumina | 12.5 | 25 | 37.5 |
| Lower layer | Late-stage retained Rh amount (g/L) | 0.0487 | 0.0325 | 0.0163 |
| | Ce-riched Rh-doped OSC material (g/L) | 84 | 56 | 28 |
| | 5% La-containing alumina | 37.5 | 25 | 12.5 |

TABLE 3

| | | Example 7 | Example 8 | Example 9 |
|---|---|---|---|---|
| Upper layer | Late-stage retained Rh amount (g/L) | 0.0163 | 0.0325 | 0.0487 |
| | Ce-riched Rh-doped OSC material (g/L) | 28 | 56 | 84 |
| | 5% La-containing alumina | 12.5 | 25 | 37.5 |
| Lower layer | Late-stage retained Rh amount (g/L) | 0.0487 | 0.0325 | 0.0163 |
| | Zr-riched Rh-doped OSC material (g/L) | 84 | 56 | 28 |
| | 5% La-containing alumina | 37.5 | 25 | 12.5 |

These catalysts (Examples 4 to 9) were also subjected to aging in an atmospheric atmosphere at a temperature of 1000° C. for a hold time of 24 hours.

(Evaluation for Conversion Efficiency)

Figure 9:
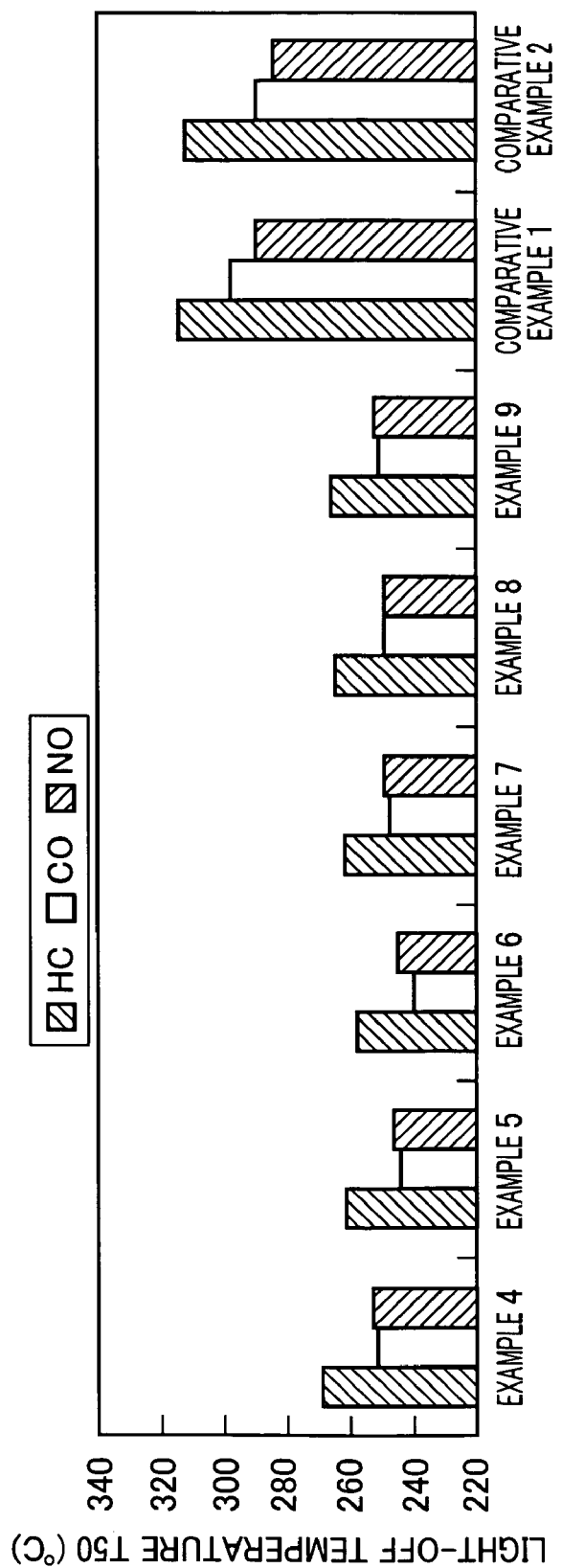
FIG. 9 is a graph showing a light-off temperature T50 in each of Examples 4 to 9 and Comparative Examples 1 and 2.
Figure 10:
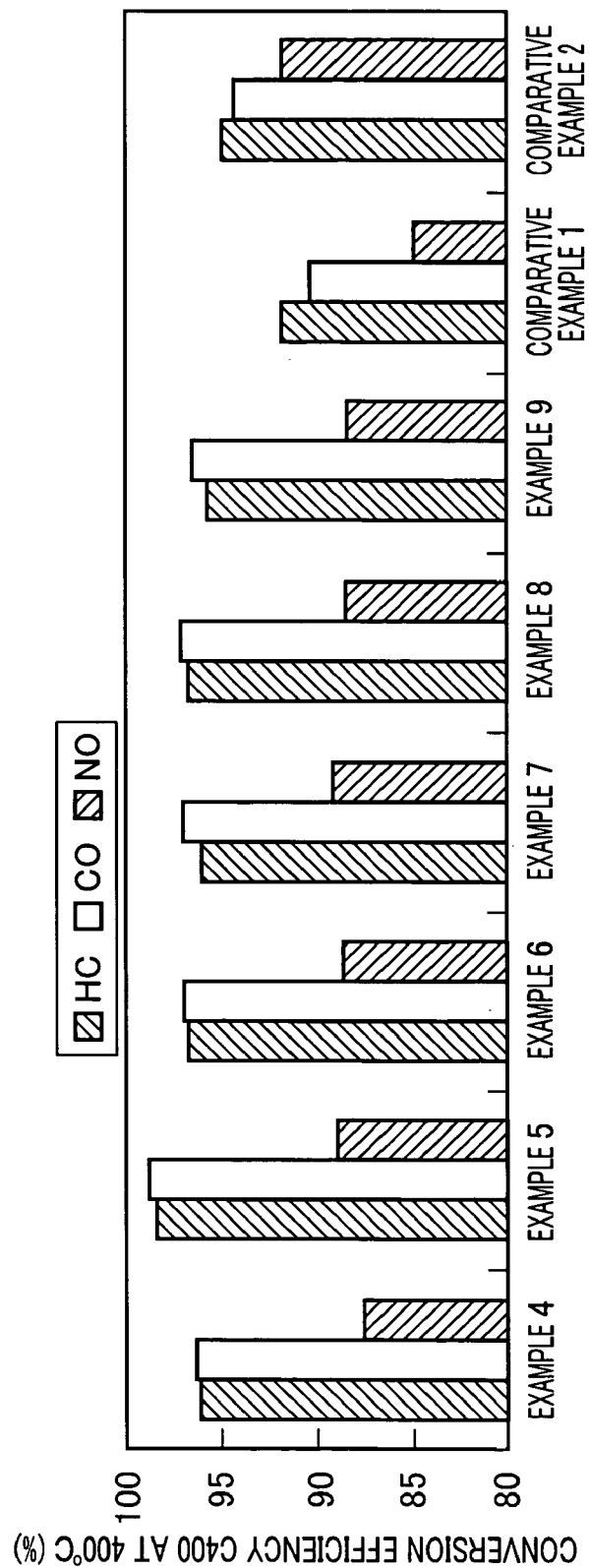
FIG. 10 is a graph showing a high-temperature conversion ratio C400 in each of Examples 4 to 9 and Comparative Examples 1 and 2.

An evaluation of conversion efficiency was performed in the same manner as that in Examples 1 to 3, and respective catalyst conversion efficiency in Examples 4 to 9 were measured using the model-gas flow reactor and the exhaust emission analyzer. FIGS. 9 and 10 show the measurement result. FIG. 9 is a graph showing T50 in Examples 4 to 9 and Comparative Examples 1 and 2, and FIG. 10 is a graph showing C400 in Examples 4 to 9 and Comparative Examples 1 and 2.

As seen in FIGS. 9 and 10, in both the light-off temperature T50 and the high-temperature conversion ratio C400, the catalytic layer formed of a laminated structure including the layer containing the first mixed oxide and the layer containing the second mixed oxide is superior to the catalytic layer formed using only either one of the first and second mixed oxides. As to T50, each of Examples 4 to 9 can have a lower temperature than Comparative Examples 1 and 2 by 30° C. or more. As to C400, each of Examples 4 to 9 is improved as compared with Comparative Examples 1 and 2 by 2 to 3%. Further, as seen in FIG. 10, when the ratio between the first and second mixed oxides is approximately 50%, C400 is further improved. In particular, Examples 4 to 6 where the catalytic layer containing the second mixed oxide is formed as the upper layer exhibit a higher conversion efficiency than those in Examples 7 to 9 where the catalytic layer containing the second mixed oxide is formed as the lower layer.

As above, multilayer catalytic layers formed by laminating a catalytic layer containing either one of the first and second mixed oxides and another catalytic layer containing the other mixed oxide can improve conversion efficiency as compared with a single catalytic layer containing only either one of the first and second mixed oxides in a exhaust gas purifying catalyst.

(Conversion Efficiency Improving Mechanism in Examples)

Examples 1 to 9 can provide improved conversion efficiency as compared with Comparative Examples 1 and 2. This mechanism will be for the following reason.

Figure 12A:
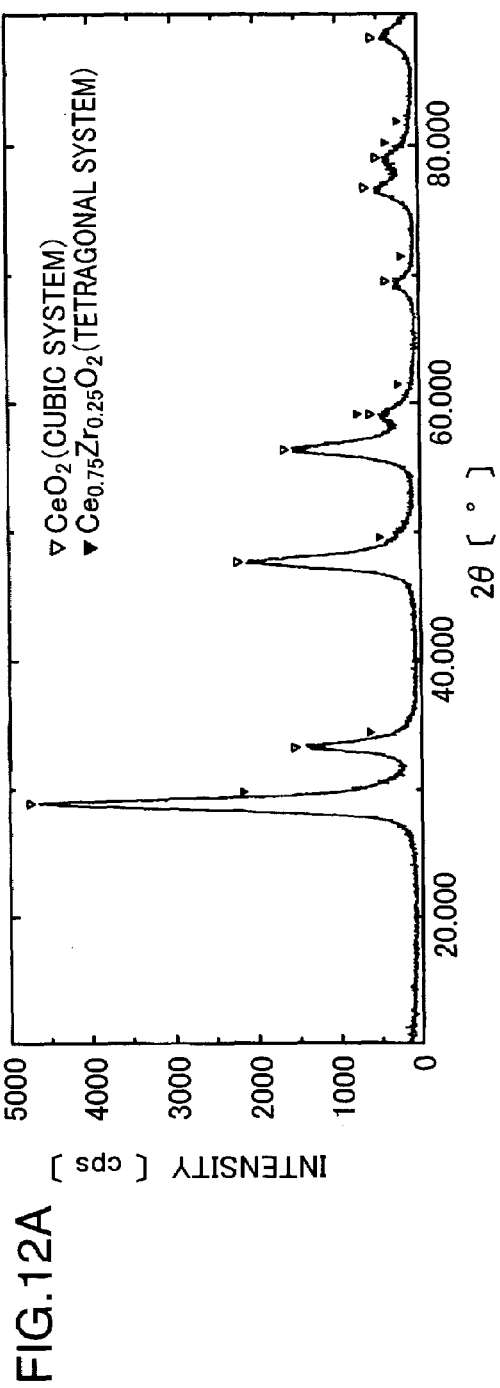
FIG. 12A is a graph showing an XRD chart of a first mixed oxide in its fresh state.

As to Comparative Examples 1 and 2, respective structures in their fresh state and after aging (in an atmospheric atmosphere at a temperature of 1000° C. for a hold time of 24 hours) were analyzed by an XRD (X-ray diffractometer). This structure analysis allows respective structural features of the first and second mixed oxides to be clarified through Comparative Examples 1 and 2. FIG. 11A shows XRD chart in the fresh state of the second mixed oxide and FIG. 11B shows after aging of the same. FIG. 12A shows XRD chart in the fresh state of the first mixed oxide and FIG. 12B shows after aging of the same.

As seen in FIGS. 11A and 11B, the second mixed oxide has a single phase of $CeZrNdO_2$ crystal both in the fresh state and after aging. This would result from a relatively small $CeO_2/ZrO_2$ mass ratio. Thus, it can be said that grain growth is likely to be accelerated and consequently Rh atoms as a catalytic noble metal are likely to sink down into the mixed oxide grains.

Figure 12B:
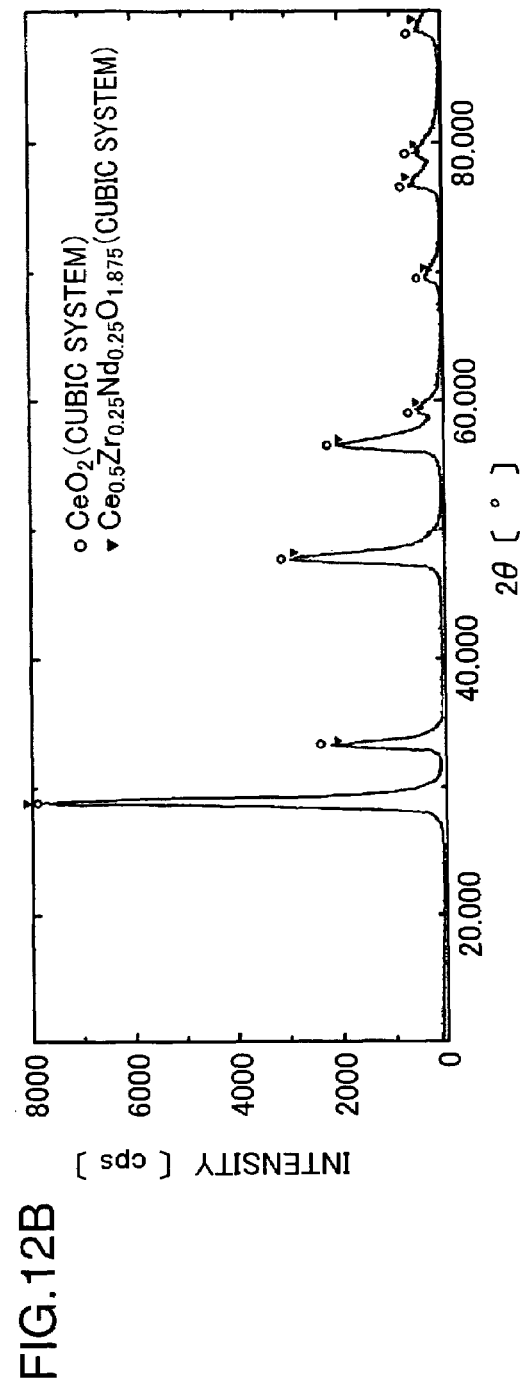
FIG. 12B is a graph showing an XRD chart of the first mixed oxide after aging.

As seen in FIGS. 12A and 12B, the first mixed oxide has a mixed phase of a $CeO_2$ crystal and other oxide crystal in the fresh state (see FIG. 12A). Thus, it can be said that even if the mixed phase is heated, the different crystal phases will act as barriers against each other to suppress grain growth. Therefore, sinkage of Rh atoms as a catalytic noble metal partially exposed outside from a surface of the mixed oxide may be minimized. Even if after the aging (see FIG. 12B), while the crystal composition is changed in some extent, the mixed phase is maintained and shows high heat resistance.

In view of the above knowledge, the first mixed oxide will excel at hydrogen and CO oxidation reactions expressed by the following formulas based on an oxidation function of Rh and on oxygen released from the inside of the mixed oxide because of having a relatively large number of Rh atoms partially exposed outside from the surface. In other words, the hydrogen oxidation reaction and the CO oxidation reaction would be accelerated primarily by the first mixed oxide.

Hydrogen Oxidation Reaction $2H_2+O_2 \rightarrow 2H_2O$

CO Oxidation Reaction $2CO+O_2 \rightarrow 2CO_2$

In contrast, Rh atoms are more likely to sink in the second mixed oxide. Thus, the number of Rh atoms partially exposed outside from the surface is relatively small, and conversely a relatively large number of Rh atoms exist inside. Therefore, the second mixed oxide will excel at a steam reforming reaction expressed by the below formulas because of having high activity in oxygen absorption/release even in its low temperature state. In other words, the hydrocarbon partial oxidation reaction and the steam reforming reaction would be accelerated primarily by the second mixed oxide. In particular, the hydrocarbon partial oxidation reaction is actively performed by the second mixed oxide. In the following partial oxidation reaction formula, HC (A) represents hydrocarbon and HC (B) hydrocarbon which remains without being oxidized (without being converted into water or carbon dioxide) in HC(A); "k" represents an oxygen molecule number used by the reaction and "m" a carbon dioxide molecule number generated by the reaction and "n" a water molecule number generated by the reaction. Meanwhile, in the following steam reforming reaction formula, HC(C) represents hydrocarbon; "p" represents a water molecule number used by the reaction, "q" a hydrogen molecule number generated by the reaction and "r" a carbon dioxide molecule number generated by the reaction.

HC Partial Oxidation Reaction HC (A)+$k$O$_2$→HC (B)+$m$CO$_2$+$n$H$_2$O

Steam Reforming Reaction HC(C)+$p$H$_2$O→$q$H$_2$+$r$CO$_2$

Specifically, for example, given that a catalytic layer is formed of the first mixed oxide only, the first mixed oxide excels at the $H_2$ and CO oxidation reactions, as mentioned above, and thereby positively oxidizes $H_2$ and CO contained in exhaust gas. However, a small amount of $H_2$ contained in the exhaust gas will be run out in a short period of time to cause deterioration in the $H_2$ oxidation reaction. The deterioration in the $H_2$ oxidation reaction makes it difficult to induce various reactions to be performed on the catalyst, due to reduction in heat generated by the reaction.

Even under the above conditions, the catalytic layer containing both the first and second mixed oxides as in the above embodiment can supply hydrogen through the steam reforming reaction based on the second mixed oxide. Thus, the hydrogen oxidation reaction based on the first mixed oxide would be activated to increase reaction heat and accelerate the HC partial oxidation reaction so as to provide drastically enhanced conversion efficiency.

The aforementioned purifying catalyst 5 is one embodiment of the present invention, and specific details thereof, such as structure and composition, may be appropriately modified and changed without departing from the spirit and scope of the present invention.

As mentioned above, the present invention is summarized as follows. An exhaust gas purifying catalyst of the present invention comprises a honeycomb-like substrate disposed in an exhaust passage for an engine, and a catalytic layer formed on a cell wall of the substrate. The catalytic layer includes a mixed oxide which contains Ce (cerium) and Zr (zirconium), and retains a catalytic noble metal in such a manner that the noble metal atoms are located at crystal lattice points or between the lattice points of the mixed oxide. The mixed oxide includes a first mixed oxide containing $CeO_2$ in a mass greater than that of $ZrO_2$, and a second mixed oxide containing $ZrO_2$ in a mass greater than that of $CeO_2$.

The above exhaust gas purifying catalyst of the present invention can achieve improved conversion efficiency as compared with the conventional purifying catalysts. This mechanism would be for the following reason.

It is believed that an HC partial oxidation reaction and an $H_2$ formation reaction are accelerated primarily by the second mixed oxide containing $ZrO_2$ in a mass greater than that of $CeO_2$, and an $H_2$ oxidation reaction and a CO oxidation reaction are accelerated primarily by the first mixed oxide containing $CeO_2$ in a mass greater than that of $ZrO_2$. Thus, $H_2$ formed by the $H_2$ formation reaction based on the second mixed oxide will be immediately oxidized by the $H_2$ oxidation reaction based on the first mixed oxide. In other words, it is believed that, while $H_2$ to be used in the $H_2$ oxidation reaction based on the first mixed oxide will be run out within a short period of time if only $H_2$ in exhaust gas is used therefor, the $H_2$ oxidation reaction based on the first mixed oxide can be efficiently performed using $H_2$ supplied from the $H_2$ formation reaction based on the second mixed oxide, which allows further improved conversion efficiency to be achieved as described above.

In addition, the exhaust gas purifying catalyst of the present invention makes it possible to quickly raise a temperature of a catalyst bed so as to achieve improved light-off characteristic. That is, it is believed that, among the reactions based on the first and second complex catalysts, the reactions for $H_2$ and CO are firstly induced, and heat resulting from these reactions can contribute to a temperature rise in the catalyst bed so as to quickly activate the purifying catalyst to achieve improved light-off characteristic.

Preferably, the first mixed oxide contains $CeO_2$ in 65 mass % or more with respect to a total mass of $CeO_2$ and $ZrO_2$, and the second mixed oxide contains $ZrO_2$ in 65 mass % or more with respect to a total mass of $CeO_2$ and $ZrO_2$.

This makes it possible to further improve the conversion efficiency and quickly activate the purifying catalyst so as to achieve further improved light-off characteristic.

Preferably, the catalytic noble metal is at least one selected from the group consisting of Pt, Pd and Rh. In particular, Ph may be included in the catalytic noble metal to provide drastically enhanced oxygen absorption/release performance to the mixed oxide.

Preferably, the catalytic layer comprises a mixture of the first mixed oxide and the second mixed oxide.

In this purifying catalyst, the respective mixed oxide are distributed evenly over the catalytic layer to allow a reaction by-product, such as $H_2$ created by a reaction based on the second mixed oxide to be used by the adjacent first complex so as to provide enhanced conversion efficiency.

In the above purifying catalyst, while a mixing ratio between the first and second mixed oxides is not limited to a specific value, a mixing ratio of the first mixed oxide to a total mass of the first and second mixed oxides may be set in the range of 5 to 99 mass %, with a view to obtaining a given light-off characteristic, as shown in the aforementioned test result. In this case, the mixing ratio of the first mixed oxide is set preferably in the range of 20 to 99 mass %, more preferably, in the range of 45 to 75 mass %. This makes it possible to provide improved high-temperature conversion ratio as well as improved light-off characteristic.

The catalytic layer may be formed of a single layer containing a mixture of the first and second mixed oxides. Alternatively, the catalytic layer may comprise a plurality of layers having a laminated structure. In this case, at least one of the layers contains the first mixed oxide, and at least one of the remaining layers contains the second mixed oxide.

In this purifying catalyst, the respective mixed oxides are densely arranged to induce reactions in a concentrated manner, and thereby each of the layers can formed to be reduced in thickness. This makes it possible to reduce a heat capacity of the catalytic layer and quickly raise a temperature of the catalytic layer so as to quickly activate the purifying catalyst. In addition, the reactions performed in the respective layers in a concentrated manner generate heat in a concentrated manner to allow the temperature of the catalyst to be efficiently increased. This makes it possible to further quickly activate the purifying catalyst.

In the above laminated structure, for example, when the catalytic layer is formed in a two-layer structure, the layer containing the second mixed oxide is formed as an upper layer. This allows the layer containing the second mixed oxide to be efficiently warmed up by an exothermic reaction in a lower layer so as to quickly activate the purifying catalyst.

This application is based on Japanese Patent Application Ser. No. 2005-311634 filed with Japan Patent Office on Oct. 26, 2005, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust gas purifying catalyst comprising:
   a honeycomb substrate disposed in an exhaust passage for an engine; and
   a catalytic layer formed on a cell wall of said substrate, said catalytic layer including a mixed oxide which contains Ce (cerium) and Zr (zirconium), and retains a catalytic noble metal in such a manner that said noble metal atoms are located at crystal lattice points or between the lattice points of the mixed oxide, wherein
   said mixed oxide includes a first mixed oxide containing $CeO_2$ in a mass greater than that of $ZrO_2$, and a second mixed oxide containing $ZrO_2$ in a mass greater than that of $CeO_2$,
   wherein said first mixed oxide contains $CeO_2$ in 65 mass % or more with respect to a total mass of $CeO_2$, and $ZrO_2$;
   said second mixed oxide contains $ZrO_2$ in 65 mass % or more with respect to a total mass of $CeO_2$ and $ZrO_2$, and
   wherein said catalytic layer comprises a plurality of layers having a laminated structure, at least one of said layers containing said first mixed oxide, and at least one of the remaining layers containing said second mixed oxide.

2. The exhaust gas catalyst as defined in claim 1, wherein a mass ratio of said first mixed oxide with respect to said second mixed oxide is set in a range of 25/75 to 75/25 inclusive.

3. The exhaust gas purifying catalyst as defined in claim 2, wherein the layer containing the first mixed oxide is formed as an upper layer while the layer containing the second mixed oxide is formed as a lower layer.

4. The exhaust gas purifying catalyst as defined in claim 1, wherein the layer containing the first mixed oxide is formed as an upper layer while the layer containing the second mixed oxide is formed as a lower layer.

5. The exhaust gas purifying catalyst as defined in claim 1, wherein said catalyst noble metal includes at least Rh.

* * * * *

UNITED STATES PATENT AND TRADEMARK OFFICE
CERTIFICATE OF CORRECTION

PATENT NO. : 7,608,561 B2  
APPLICATION NO. : 11/546340  
DATED : October 27, 2009  
INVENTOR(S) : Miyoshi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 421 days.

Signed and Sealed this

Twelfth Day of October, 2010

David J. Kappos  
*Director of the United States Patent and Trademark Office*